United States Patent [19]

Goldberg

[11] 4,334,773
[45] Jun. 15, 1982

[54] CLIP-ON LENS TARGET

[76] Inventor: Norman N. Goldberg, 1408 Baskerville, Madison, Wis. 53716

[21] Appl. No.: 156,506

[22] Filed: Jun. 4, 1980

[51] Int. Cl.³ .............................................. G01B 9/00
[52] U.S. Cl. ...................................... 356/124; 356/243
[58] Field of Search ................ 356/124, 125, 127, 243

[56] References Cited

U.S. PATENT DOCUMENTS 2,640,392  6/1953  Freeman ............................ 356/125
3,880,525  4/1975  Johnson ............................ 356/127

FOREIGN PATENT DOCUMENTS 874119  8/1961  United Kingdom ................ 356/124

Primary Examiner—R. A. Rosenberger
Attorney, Agent, or Firm—Isaksen, Lathrop, Esch, Hart & Clark

[57] ABSTRACT

A clip-on lens target (10) is disclosed which is suitable for attachment to an elongated light source, such as a fluorescent light (12). The target (10) is attached to the light source (12) by a series of clamps (20) and has a plurality of accurately sized and spaced holes (18) formed in it. Light shining through the holes (18) creates a standard light pattern which may be photographed by a camera so that photographs taken of the standard light pattern can be analyzed to determine the optical characteristics of the camera making the photographs.

6 Claims, 3 Drawing Figures

CLIP-ON LENS TARGET

TECHNICAL FIELD

The present invention relates to photographic measuring and testing in general, and, in particular, to standard photographic targets which may be photographed by cameras to be tested with the resultant photograph being analyzed to determine the optical characteristics of the camera.

DESCRIPTION OF THE PRIOR ART

The prior art is generally cognizant of the use of photographic test targets which may be photographed by a camera to be tested so that the resulting photograph can be analyzed and compared with the standard target to determine any inaccuracies or variations in the camera. Examples of targets used for such a purpose are shown in U.S. Pat. Nos. 182,099, 2,226,167, 2,380,244. These targets in particular are used to measure the tonal accuracy and resolution of the photographs of a camera. Other patents showing targets which are used to test the accuracy and focusing ability of optical systems include U.S. Pat. Nos. 3,785,733 and 4,110,046. In addition it is generally known in the prior art that electronic means can be used in conjunction with an optical system to measure the accuracy of the lens or other optical system, as shown in U.S. Pat. Nos. 4,123,788 and 4,126,395.

SUMMARY OF THE INVENTION

The present invention is summarized in that a photographic lens target adapted to being mounted on an elongated light source comprises an elongated strip of opaque, flexible sheet material sized so that it can be fitted over the light source, the strip having a plurality of accurately spaced and sized holes formed therein so that when the strip is fitted over the light source a standard light pattern is created so that photographs taken of the standard light pattern can be analyzed to determine the accuracy of the optics of the camera making the photographs.

It is an object of the present invention to provide a standard clip-on lens test target which can be used by amateur photographers at home to check the accuracy and characteristics of the lens system of their camera.

It is another object of the present invention to provide a lens test target which is portable and which can be therefor utilized in any remote location.

It is a further object of the present invention to provide such a lens test target which is economical to manufacture and utilize so that the testing of the lens system of a camera can become a procedure which an amateur can accomplish easily and accurately at home.

Other objects, advantages, and features of the present invention will become apparent from the following specification when taken in conjunction with the accompanying drawings.

DETAILED DESCRIPTION OF THE PREFERRED EMBODIMENT

Figure 1:
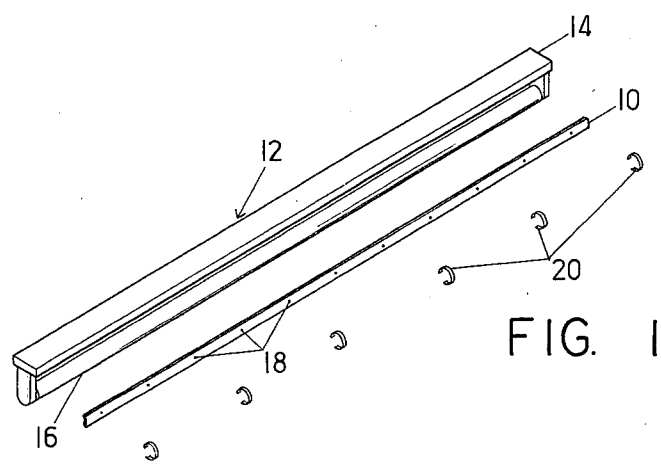
FIG. 1 is an exploded perspective view of a clip-on lens test target constructed in accordance with the present invention.

Shown in FIG. 1, and generally indicated at 10, is a photographic clip-on lens test target constructed in accordance with the present invention. FIG. 1 is an exploded view of the test target 10 as it would be mounted on a light source. The light source, which is indicated at 12, is a conventional fluorescent light, including a fluorescent fixture 14 into which is inserted a fluorescent tube 16. The test target 10 is attached to the light source 12 so as to utilize the light emitting therefrom to create a standard light pattern as will be discussed below.

The test target 10 itself is an elongated strip of opaque, flexible sheet material. Thus the test target 10 may be constructed of pre-stressed, spring-steel strip stock, as is often used in steel tape measures, but is preferably constructed of a elongated, narrow strip of black plastic material of a flexible yet semi-rigid nature. The test target 10 is preferably provided with a curvature similar to that of the tube 16. The strip of the test target 10 can be relatively thin in depth, as long as it is sufficiently opaque, and may be any desired width from as small as a half an inch in width to sufficiently wide to extend completely around the tube 16 of the light source 12. The test target 10 has provided in it a plurality of accurately spaced and sized circular holes 18. The holes 18, which are formed as accurately and regularly sized as is possible, are regularly spaced on an accurate center-to-center pattern in a preselected pattern. For example, one possible arrangement of the holes 18 is to provide that each of the holes is 1 millimeter in diameter and that the holes are formed at 100 millimeter spacing center-to-center. Any desired hole size and spacing between the holes 18 can be utilized as long as that arrangement is accurate so that it can be compared to the pattern contained in the photographs taken of the test target. The test target is provided with a plurality of clamps 20, each of which is formed of relatively rigid, resilient material and is formed in a "C" shape. The clamps 20 may be formed of plastic, sheet metal, or other rigid yet bendable material having a resilient tendency to return to the desired "C" shape.

In utilizing the test target 10 of FIG. 1, the strip of material comprising the test target 10 is placed over the tube 16 of the light source 12. The clamps 20 are clamped over the exterior of the test target 10 and around the tube 16 so as to securely fasten the test target 10 on the tube 16. Care must be taken to make sure that none of the clamps 20 is located directly over one of the holes 18 located in the test target 10, and for that reason the clamps 20 must be narrower in width than the spacing between the holes 18 in the test target 10. With the test target 10 in place, the light source 12 is energized so that light is emitted through the holes 18 in the test target 10 in a pre-selectable standard light pattern. Obviously the light pattern created by the assembly of the test target 10 on the light source 12 is variable depending on the size of the holes and the spacing between the holes selected for the test target 10.

In utilizing the test target 10 as assembled, a photographer need only take a photograph of the standard light pattern created by the test target 10 and the light source 12. Thus, for example, if the photographer takes a photograph of the test target 10 from a predetermined distance and at an angle perpendicular to the elongated axis of the light source 12, and if the photographer insures that the centermost dot created by the centermost hole 18 in the test target 10 is perfectly in focus, the photographer can examine the resulting photograph and the size of the images thereon created by light emitting through the remaining holes 18 to determine the extent to which the focus at the center of the optical field of his camera is maintained throughout the remainder of the optical field of the camera.

Similarly, other variations in the sizes and shapes of the images in a photograph of the test target 10, and variations in the spacings between the images can give information as to the accuracy of the camera. For instance, lens astigmatism might be indicated by fuzzy or oddly shaped images toward the edges of the pattern. By contrast, a photograph containing a series of clear, point-like and regularly spaced dots would indicate a good optical system in the camera. Information can thus be obtained both by the size and shape of the images created by the light emitting through the holes 18 and the distance between the images, but also from any variations in the sizes and shapes of the images and spacings throughout the optical field of the camera.

The clip-on lens test target of the present invention is particularly advantageous in that it enables home amateur photographers to check the characteristics of the lens system of their camera by comparing photographs taken with that camera with standard images. In order for such photographs to be compared with a standard image, the photographer must have a standard test target of which he can take a photograph. The clip-on test target 10 of the present invention provides such a standard test target when attached to a light source, such as a fluorescent lamp 12, by creating a standard light pattern which may be photographed by the amateur photographer. It is a further advantage of this kind of camera testing system in that it makes a permanent record of the test since the photograph made by the camera is a permanent record of the characteristics of that camera which may be compared not only with photographs by other cameras but also with later photographs by the same camera.

Figure 2:
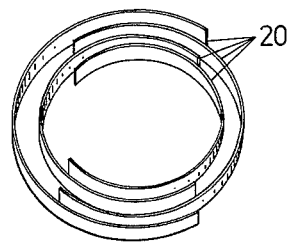
FIG. 2 is a perspective view of the lens test target of FIG. 1 and the clips associated therewith in their storage position.
Figure 3:
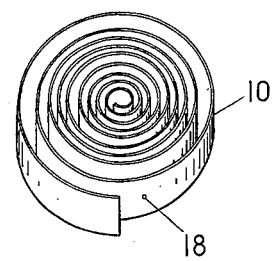
FIG. 3 is a perspective view of a package for merchandising the test target of FIG. 1.

In order for such a lens test target 10 to be particularly adapted for use by amateurs and for portable use by professionals, it is important that the test target 10 be adapted for portability. As is shown in FIG. 2, the test target 10 can be rolled into a coil and the clamps 20 can be assembled into a circular package which can surround the coil of the test target 10 so as to form a compact package which can be conveniently carried by an amateur or professional photographer. This compact package can be carried to any location in which it is desired to test a particular camera, with only a light source, such as a fluorescent lamp 12, being necessary to complete the construction of a test target which may be photographed. Additionally, shown in FIG. 3 is a package 22 in which the test target of the present invention could be merchandised. The package 22 is a blister package including a sheet of paperboard having attached thereto a "blister" of clear thermoplastic material into which the coiled test target 10 and accompanying clamps 20 are received. The package 22 could be easily utilized in existing commercial displays and allows the amateur photographer to thereby buy a lens test target which may be utilized at home with any convenient fluorescent light source.

It can be readily ascertained from the foregoing description and an analysis of the features of the lens test target of the present invention that the lens test target 10 provides a target whose accuracy is only dependent upon the accurate sizing and spacing of the holes 18 in the test target 10. Since the sizing and spacing of such holes 18 as a relatively easy manufacturing process to control, it can be readily seen that the test target 10 of the present invention is very accurate in spite of the fact that it is relatively economical to manufacture. Thus while the test target 10 of the present invention provides great portability and ease in use, it sacrifices little accuracy in its use and can in fact, provide more accuracy than can often be meaningfully utilized by an amateur photographer.

While the present invention has been described and illustrated as it is to be used on conjunction with a fluorescent light source, it is to be understood that the test target 10 of the present invention can be utilized with any of a wide variety of light sources. A fluorescent light source, such as the light source 12 illustrated in FIG. 1, is particularly adapted for use with the present invention because it is elongated in shape thereby allowing a relatively large number of spaced holes 18 to be illuminated by a single light source. However, it is also envisioned that other differently shaped light sources could be utilized with a test target according to the present invention as long as the test target 10 itself was constructioned in a shape so as to be capable of being fitted over the appropriate light source with which it is to be used. It is preferred that any such light source that is utilized be of sufficient size so that a relatively large number of holes 18 in the test target 10 can be illuminated.

It is understood that the present invention is not limited to the particular construction and arrangement of parts disclosed and illustrated herein, but embraces all such modified forms thereof as come within the scope of the following claims.

I claim:

1. A photographic lens test target (10) adapted to be mounted on an elongated flourescent light tube (12), comprising:
   an elongated strip of opaque, sheet material sized so that it can be fitted over the flourescent light tube (12) with acurvature similar to that of the tube (12), the strip being sufficiently flexible that it can be coiled into a small coil for easy and compact carrying, the strip having a plurality of accurately spaced and sized holes (18) formed therein so that when the strip is fitted over the light source (12) a standard light pattern is created so that photographs taken of the standard light pattern can be analyzed to determine the accuracy of the optics of the camera making the photographs.

2. A photographic lens test target as claimed in claim 1 wherein there is also provided a plurality of clamps (20) designed to fit over the strip of sheet material so as to attach the strip to the flourescent light tube (12).

3. A photographic lens test target as claimed in claim 1 wherein the elongated strip is constructed of plastic material.

4. A photographic lens test target as claimed in claim 1 wherein the elongated strip is constructed of spring-steel strip stock.

5. A photographic lens test target as claimed in claim 1 wherein the spacing between the holes (18) in the strip is uniform throughout the strip.

6. A method of testing the lens of a photographic camera comprising the steps of:
attaching over an elongated flourescent light tube (12) an elongated strip (10) of opaque, flexible sheet material having a curvature similar to that of the light tube (12) and a plurality of accurately spaced and sized holes (18) formed therein;
photographing the light pattern created by light passing through the holes (18) in the elongated strip (10) to provide a photograph of the light pattern on which the size, shape, and spacing of the image of the light pattern of the photograph are determined by the characteristics of the lens system of the camera.

* * * * *